United States Patent [19]
Cassarly et al.

[11] Patent Number: 5,692,091
[45] Date of Patent: Nov. 25, 1997

[54] COMPACT OPTICAL COUPLING SYSTEMS

[75] Inventors: William J. Cassarly; John M. Davenport, both of Lyndhurst; Richard L. Hansler, Pepper Pike, all of Ohio

[73] Assignee: General Electric Company, Schenectady, N.Y.

[21] Appl. No.: 530,916

[22] Filed: Sep. 20, 1995

[51] Int. Cl.$^6$ ........................................ G02B 6/24
[52] U.S. Cl. ................. 385/146; 362/32; 385/31; 385/43; 385/901
[58] Field of Search ................. 362/32; 385/15, 385/31, 33, 38, 39, 43, 133, 146, 901

[56] References Cited

U.S. PATENT DOCUMENTS

| | | | |
|---|---|---|---|
| 3,832,028 | 8/1974 | Kapron | 385/43 |
| 3,901,581 | 8/1975 | Thiel | 385/43 X |
| 4,950,059 | 8/1990 | Roberts | 349/61 |
| 5,271,077 | 12/1993 | Brockman et al. | 385/31 |
| 5,290,169 | 3/1994 | Friedman et al. | 433/29 |
| 5,341,445 | 8/1994 | Davenport et al. | 385/39 |
| 5,506,929 | 4/1996 | Tai et al. | 385/146 |

FOREIGN PATENT DOCUMENTS

| | | | |
|---|---|---|---|
| 0046172 | 2/1982 | European Pat. Off. | 385/146 |
| 0642047A1 | 3/1995 | European Pat. Off. | |
| 1385603 | 3/1965 | France . | |
| 1472267 | 12/1969 | Germany . | |
| 1936715 | 8/1979 | Germany | 385/901 |
| 1211705 | 8/1989 | Japan . | |

OTHER PUBLICATIONS

Mathyssek, "Communication and European Search Report," European Patent Office, Dec. 17, 1996, three pages.

*Primary Examiner*—John D. Lee
*Attorney, Agent, or Firm*—George E. Hawranko

[57] ABSTRACT

A compact optical coupling member is useful for coupling non-coherent light from a source of light to a light distribution harness. The coupling member includes an elongated light transmissive body having a central longitudinal axis, an inlet end for receiving light from the light source, and an outlet end for providing light to a leading end of a light distribution harness. The elongated body has a polygonal cross-sectional shape for providing increased light mixing of the non-coherent light. The polygonal shape of the elongated body increases in size from a first cross-sectional area at the inlet end to an enlarged cross-sectional area at the outlet end for reducing, with respect to the longitudinal axis, the maximum angle of light passed through the outlet end relative to the maximum angle of light received through the inlet end. A pair of compact optical coupling members of the foregoing type may be used for coupling non-coherent light from first and second sides of the source of light to respective first and second light distribution harnesses. A compact, folded optical system may be realized by making the polygonal shape of a an elongated body of an optical coupling member trapezoidal; and using a plano-convex lens as part of the light distribution harness. The plano-convex lens has a convex surface through which light is received from the coupling member, and a mirrored, planar surface confronting the coupling member and being for reflecting light at an angle that causes the light to substantially miss the coupler.

5 Claims, 4 Drawing Sheets

COMPACT OPTICAL COUPLING SYSTEMS

CROSS-REFERENCE TO RELATED APPLICATION

The present application is related to application Ser. No. 08/116,146, entitled "An Improved Optical Coupling Arrangement Between a Lamp and a Light Guide," filed on Sep. 2, 1993, by J. M. Davenport et al., now U.S. Pat. No. 5,560,699, and assigned to the same assignee as the present application.

FIELD OF THE INVENTION

The present invention relates to optical couplers and optical coupling systems for coupling a source of non-coherent light to a light distribution harness, wherein the couplers are polygonal in cross section to increase light mixing and, thereby, uniformity of intensity and color of output light. More particularly, the present invention relates to optical couplers and systems having a compact length.

BACKGROUND OF THE INVENTION

Optical coupling systems employing polygonal optical couplers are known, for instance, from U.S. Pat. No. 5,341,445 issued to J. Davenport and R. Hanslet (also present inventors), and assigned to the present assignee. The '445 patent teaches the use of optical couplers for receiving light from a high brightness light source, and outputting the light into distribution harnesses for routing the light to remote optics. In particular, the '445 patent teaches the use of optical couplers whose cross sections are polygonal, e.g., square, rectangular, triangular, or hexagonal. Light from a non-coherent light source that passes into an inlet end of a polygonally shaped coupler becomes mixed to a high degree before passing through an outlet end into a light distribution harness for distribution to output optics (i.e., remote optical fixtures). The highly mixed light exhibits a high degree of uniformity in intensity and color, which is required in many lighting applications.

It is an objective of the present invention to provide polygonal optical couplers and optical coupling systems using such couplers that are more compact, i.e., of reduced length, compared to the prior art optical coupling systems using polygonal couplers. This objective addresses the need for fitting optical coupling systems into small spaces or enclosures (e.g., for video projectors). Realizing such objective will contribute to more fully utilizing the many benefits of optical distribution systems such as high energy-usage efficiency and reduced maintenance.

A further objective of the invention is to provide polygonal optical coupling systems for more efficiently coupling light received by a coupler from a light source at a high angle.

SUMMARY OF THE INVENTION

In one form, the invention provides a compact optical coupling member for use in coupling non-coherent light from a source of light to a light distribution harness. The coupling member includes an elongated light transmissive body having a central longitudinal axis, an inlet end for receiving light from the light source, and an outlet end for providing light to a leading end of a light distribution harness. The elongated body has a polygonal cross-sectional shape for providing increased light mixing of the non-coherent light. The polygonal shape of the elongated body increases in size from a first cross-sectional area at the inlet end to an enlarged cross-sectional area at the outlet end for reducing, with respect to the longitudinal axis, the maximum angle of light passed through the outlet end relative to the maximum angle of light received through the inlet end.

In another form, the invention provides a pair of compact optical coupling members of the foregoing type, for coupling non-coherent light from first and second sides of the source of light to respective first and second light distribution harnesses.

A compact, folded optical system is realized by making the polygonal shape of a an elongated body of an optical coupling member trapezoidal; and using a plano-convex lens as part of the light distribution harness. The plano-convex lens, in particular, has a convex surface through which light is received from the coupling member, and a mirrored, planar surface confronting the coupling member and being for reflecting light at an angle that causes the light to substantially miss the coupler.

BRIEF DESCRIPTION OF THE DRAWINGS

The foregoing, and further, objects and advantages of the invention will become apparent from the following description when read in conjunction with the drawing, in which like reference characters designate like or corresponding parts throughout the several views, and in which.

DETAILED DESCRIPTION OF THE PREFERRED EMBODIMENTS

In the following description, terms such as "top," "bottom," "left," and "right" are used for convenience and are not to be construed as limiting terms.

Figure 1:
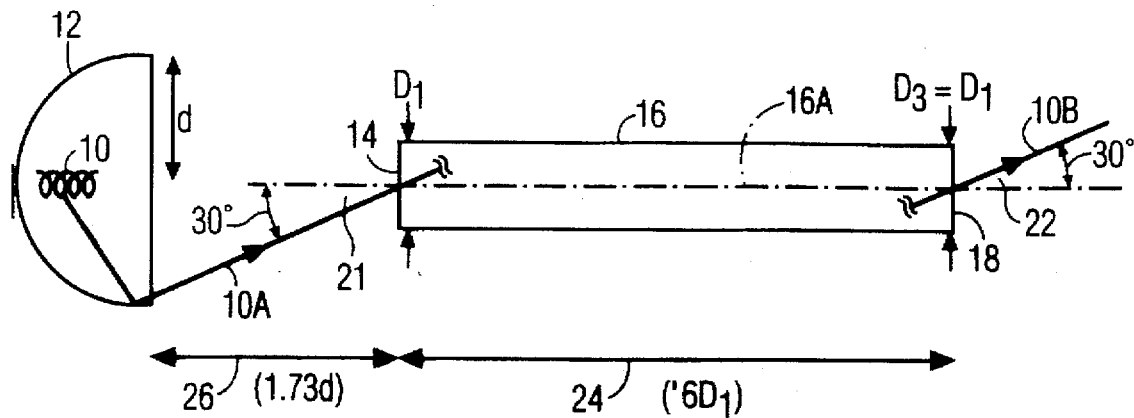
FIG. 1 is a side plan view of an optical coupling system constructed in accordance with the prior art.

In order to more particularly illustrate how the present invention differs from the prior art, the prior art optical coupling system of FIG. 1 is first described. Such system includes a light source 10 preferably of high brightness, such as a xenon metal halide lamp. An ellipsoidal reflector 12 focusses light from source 10, which is shown schematically as a lamp filament, to the plane in which the left, or inlet, end 14 of a prior art optical coupler 16 is situated. Left (or inlet) end 14 and right (or outlet) end 18 of coupler 16 are respectively shown in FIGS. 1A and 1B. If coupler 16 is hollow, it will have interior reflective surfaces such as shown in phantom at 14A (FIG. 1A) and 18A (FIG. 1B); if coupler 16 is solid, the surfaces at 14A and 18A will not be present.

Figure 2:
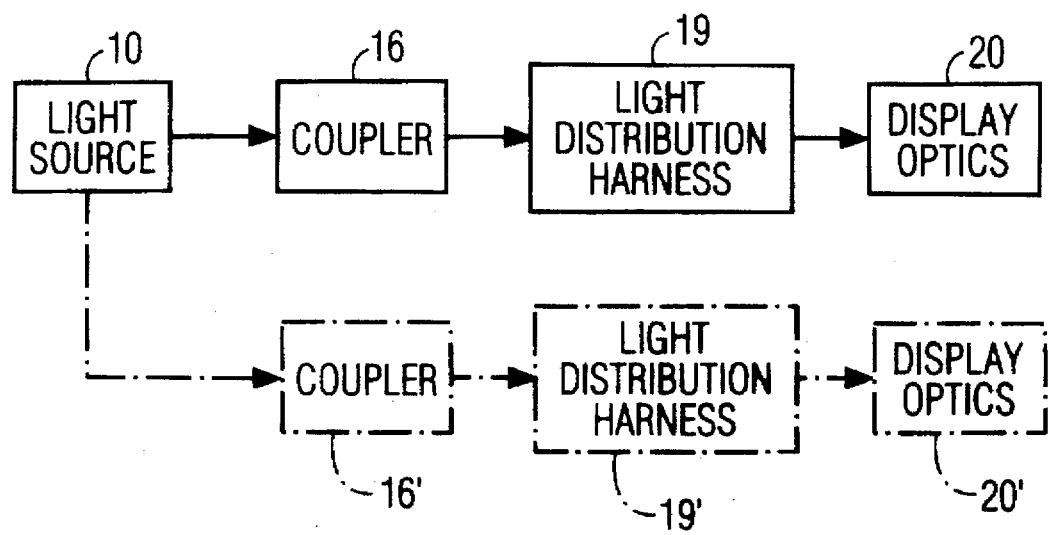
FIG. 2 is a schematic representation in block form of a light source coupled to output optics via one or more optical couplers and light distribution harnesses.

FIG. 2 schematically shows how light from light source 10 is passed to display optics 20, via coupler 16 and light distribution harness 19. Details of suitable light distribution harnesses will be apparent to those of ordinary skill in the art from, e.g., the above-cited U.S. Pat. No. 5,341,445. For instance, a light distribution harness may comprise a bundle (not shown) of optical light conductors. Alternatively, for instance, it may comprise a photographic slide and a projection lens (not shown) for modulating and routing light to display optics comprising a viewing screen (not shown). In some applications, an additional coupler 16', shown in phantom, can be used to route light to display optics 20' via light a distribution harness 16', shown in phantom.

Figure 1A:
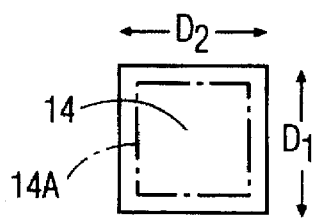
FIGS. 1A and 1B are left and right side plan views of prior art coupler 16 of FIG. 1.
Figure 1B:
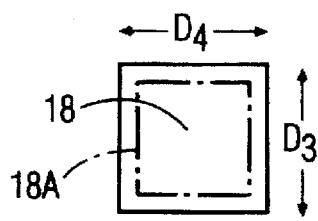

As shown in FIGS. 1, 1A and 1B, coupler 16 has a cross section along its centrally located longitudinal axis 16A that is square; i.e., dimensions $D_1$ and $D_2$ of inlet end 14 (FIG. 1A) are equal; and dimensions $D_3$ and $D_4$ of outlet end 18 are likewise equal. The cross section of coupler 16, however, may be rectangular, or have another polygonal shape such as triangular or hexagonal that improve light mixing and, thereby, uniformity in the intensity and color of output light passed through outlet end 18. The selection of appropriate polygonal shapes will be known to those skilled in the art from, e.g., above-mentioned U.S. Pat. No. 5,341,445.

Referring to FIG. 1, a maximum angle 21 of light 10A received through inlet end 14 of coupler 16, relative to longitudinal axis 16A, is shown by way of example as 30 degrees. A maximum angle 22 of light 10B passed through outlet end 18 of the coupler, relative to axis 16A, is also 30 degrees for the example illustrated. Where prior art coupler 16 is hollow, a typical length 24 for the coupler is about 6 times dimension $D_1$ of the coupler to achieve desirable light mixing, dimension $D_1$ being equal to dimension $D_2$. For a solid coupler, length 24 is typically about 9 times dimension $D_1$, dimension $D_1$ bearing the foregoing relation to dimension $D_2$. Added to length 24 of the coupler is length 26 of the spacing between reflector 12 and inlet end 14 of the coupler. Where angle 21 is 30 degrees, length 26 is about 1.73 times diameter d of reflector 12.

Figure 3:
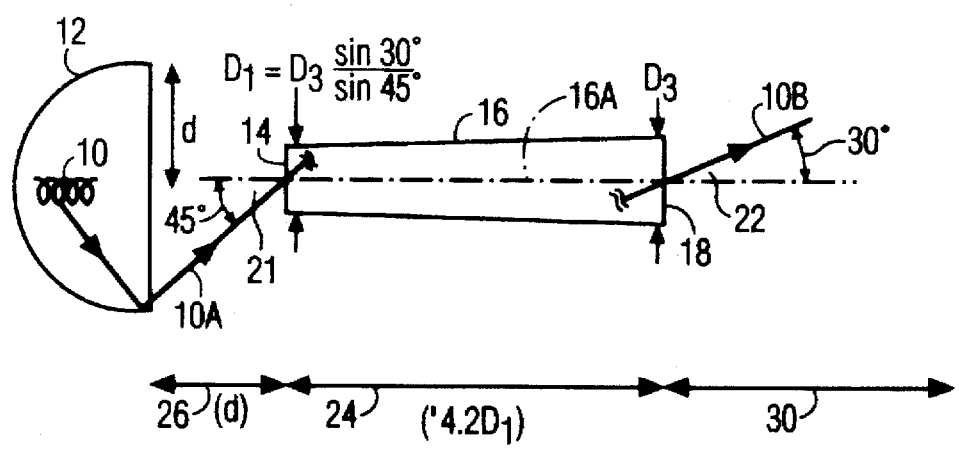
FIG. 3 is a view, similar to FIG. 1, but showing an optical coupling system according to the present invention.
Figure 3A:
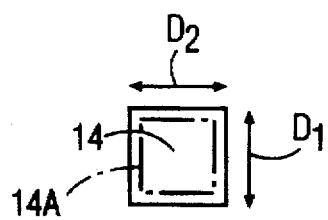
FIGS. 3A and 3B are left and right side plan views of an inventive coupler 16 of FIG. 3.
Figure 3B:
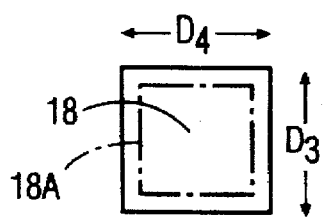

FIG. 3 shows an optical coupling system according to the present invention. FIGS. 3A and 3B show inlet 14 and outlet 18 ends of an inventive coupler 16. As mentioned with respect to FIGS. 1A and 1B, phantom lines 14A and 18A show interiorly reflecting surfaces where coupler 16 is hollow, and are not present where coupler 16 is solid.

The inventive optical coupling system of FIG. 3 is shorter than the combined lengths 24 and 26 of the prior art coupler system of FIG. 1 by a length 30. The inventive system achieves such compactness by using a coupler 16 having a polygonal cross section that increases from inlet end 14, shown in FIG. 3A, to outlet end 18, shown in FIG. 3B. Preferably, the increase in size of coupler 16 from inlet end 14 to outlet end 18 is uniform, as will be assumed for the following example.

Inventive coupler 16, so configured, performs a so-called angle-to-area conversion on the light passing through the coupler. Thus, for instance, for a maximum angle 21 of light 10A received through inlet end 14 of coupler 16, relative to longitudinal axis 16A, of 45 degrees, coupler 16 produces a maximum angle 22 of light 10B passed through outlet end 18, relative to axis 16A, of 30 degrees. This is in accordance with the Helmhotz invariant holding that the mathematical product of input dimension $D_1$ and the sine of input angle 21 equals the mathematical product of output dimension $D_1$ and the sine of output angle 22; with a corresponding relation existing for input and output dimensions $D_2$ and $D_4$ and the sines of the input and output angles corresponding to such dimensions.

With input angle 21 being 45 degrees as shown in FIG. 3, dimension 26 is equal to diameter d of reflector 12. This represents one component of reduction in length of the system shown. A second component of reduction in length of the system occurs because the shorter, tapered coupler 16 of FIG. 3 mixes light to substantially the same degree as the longer coupler 16 of prior art FIG. 1. The length 24 of inventive coupler 16 will typically be, for the square coupler shown, the mathematical product of six times the ratio of the sine of output angle 22 to the sine of inlet angle 21. Where these angles are 30 degrees and 45 degrees, respectively, length 24 of the coupler is approximately the mathematical product of 4.2 times dimension $D_1$. The length 24 of inventive coupler 16 can be even further reduced where less light mixing is required, e.g., for some video projection systems.

In an alternative embodiment, the taper of coupler 16 from inlet end 14 to outlet end 18 defines a compound parabolic reflector (not shown) made in accordance with non-imaging optics, which technology is known per se in the art. Such embodiment is preferred where the change in angle from inlet angle 21 to outlet angle 22 is relatively large compared to the above example where the taper of coupler 16 is uniform.

Figure 4:
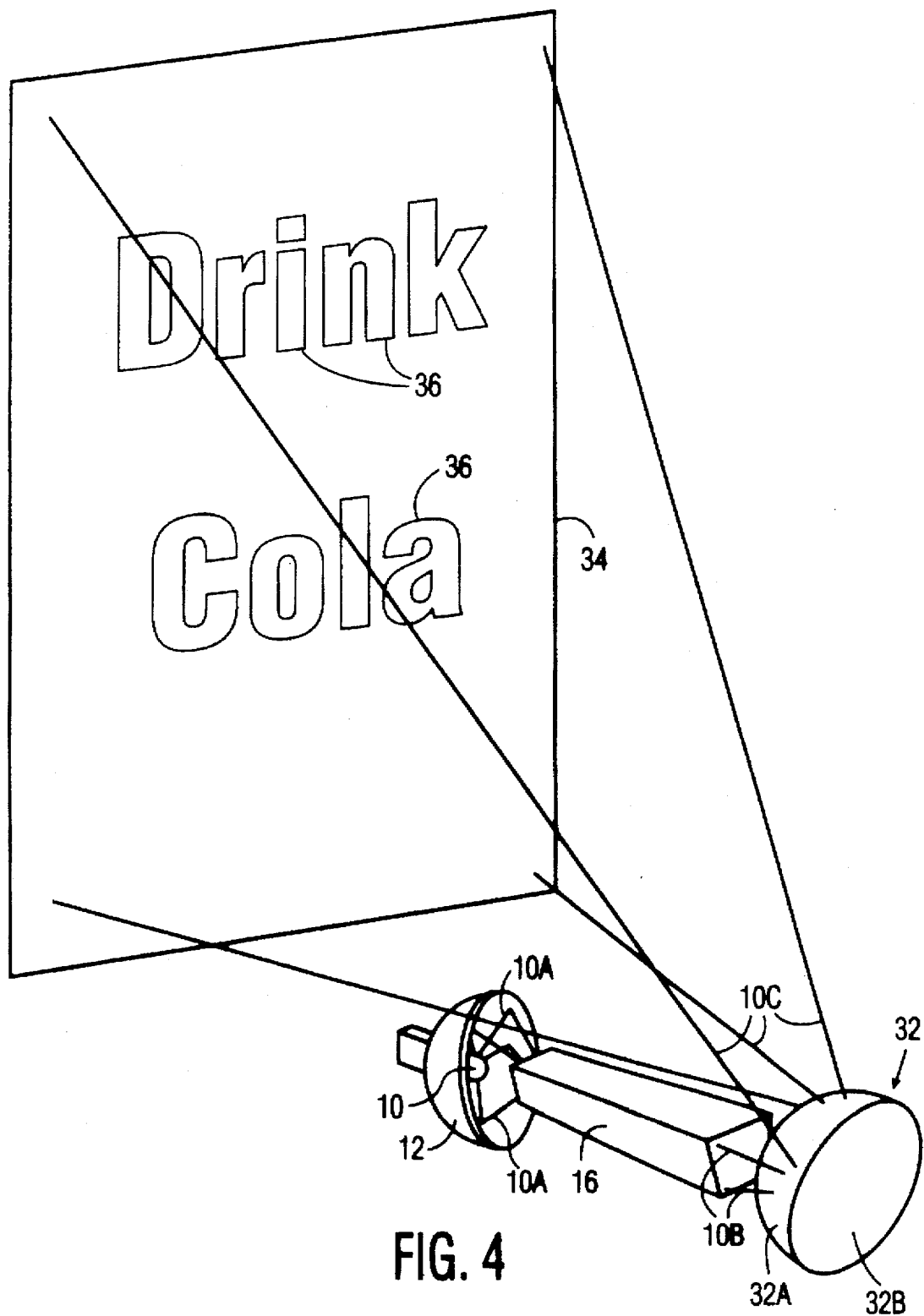
FIG. 4 is a perspective view of an optical coupling system in accordance with a specific embodiment of the present invention.

FIG. 4 shows an optical coupling system according to a specific embodiment of the present invention. As with the optical coupling system of FIG. 3, a light source 10 generates light, e.g., 10A, that is reflected by a reflector 12 into the smaller end of an optical coupler 16. The cross section of the coupler 16 in FIG. 4, however, is trapezoidal for a purpose that will become apparent. A plano-convex lens 32 receives light from the larger end of coupler 16. The change in area from one end to the other end of the coupler creates the expected reduction in the output angular distribution of light compared to the input angular distribution. This allows the use of a lens 32 with a larger f-number (i.e., ratio of lens focal length to lens diameter) than would be possible if the coupler were not tapered from one end to the other.

Lens 32 has a convex surface 32A through which light is received from coupler 16. On a planar surface of the lens, a mirrored surface 32B, confronting coupler 16, reflects light at an angle that causes the light to substantially miss the coupler. Being reflected at mirrored surface 32B, light passes through the convex lens surface 32A twice, resulting in a compact, folded optical system. Lens 32 receives light, e.g. 10B, from coupler 16 at an offset angle; e.g., a central axis of lens 32 (not shown) orthogonal to the planar, mirrored surface 32B, is oriented upwardly at an angle of, e.g., 15° relative to the central longitudinal axis (not shown) of the coupler. Light rays 10C exiting lens 32 are then directed towards a rectangular region (e.g. sign) 34, and may illuminate an image 36 on such surface. Because the distance from the bottom of rectangular image 34 to lens 32 is shorter than the distance from the top of image 34 to the lens, standard lens analysis shows that the corresponding image magnifications are different. Using a square or rectangular coupler would cause spilling of light at the top of region 34. The use of trapezoidal coupler 16, however, compensates for the different image magnifications, resulting in substantially uniform illumination across rectangular region 34, with negligible light loss.

Figure 5:
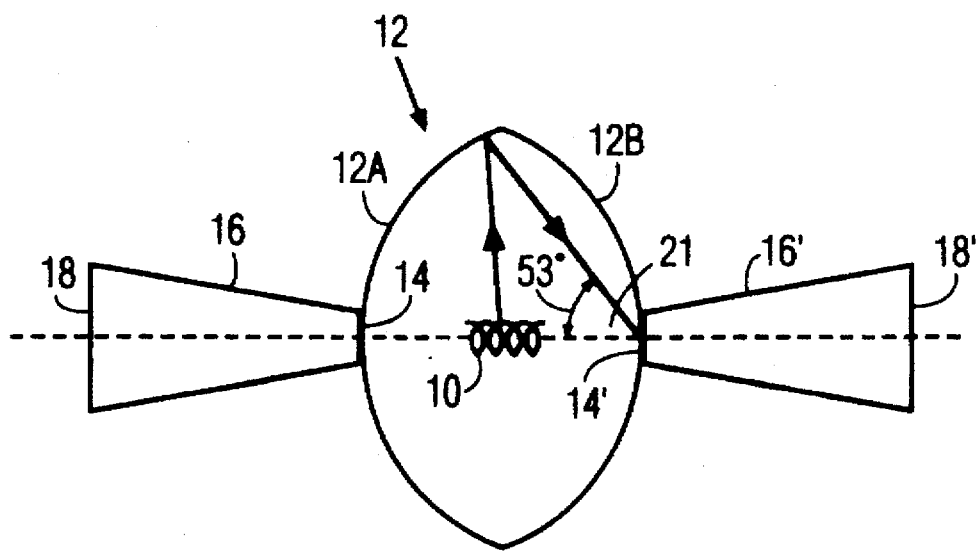
FIG. 5 is a side plan view of an optical coupling system employing a pair of optical couplers according to the present invention.

FIG. 5 shows the application of the principles of the present invention to an optical coupling system employing a pair 16, 16' of optical couplers that are tapered as described above in connection with inventive coupler 16 of FIGS. 3, 3A and 3B. Such an arrangement is especially useful for coupling light from a light source 10 that is at a high angle 21, such as 53 degrees as shown. Reflector 12 in this case can be generally dam-shell shaped, employing left and right ellipsoidal members 12A and 12B, respectively, that are shaped to direct light from source 10 at respective focal planes at inlet ends 14 and 14' of the optical couplers. The use of tapered couplers provides a significantly more efficient means of collecting high-angle light from source 10 than the prior art system of present FIG. 1, for example.

While the invention has been described with respect to specific embodiments by way of example, many modifications and changes will occur to those skilled in the art. It is, therefore, to be understood that the appended claims are intended to cover all such modifications and changes as fall within the true scope and spirit of the invention.

What is claimed is:

1. A compact optical coupling member for use in coupling non-coherent light from a source of light to a light distribution harness, in combination with the light distribution harness; said coupling member comprising:

(a) an elongated light transmissive body having a central longitudinal axis, an inlet end, non-coincident with the light source, and disposed at one end of said axis for receiving light from the light source, and an outlet end at another end of said axis for providing light to a leading end of a light distribution harness;

(b) said elongated body having a trapezoidal cross-sectional shape along said axis for providing increased light mixing of said non-coherent light;

(c) said inlet end having first and second adjacent, peripheral dimensions; and said outlet end having respectively corresponding first and second adjacent, peripheral dimensions which are both greater than the corresponding dimensions of said inlet end; and said trapezoidal shape of said elongated body increasing in size from a first cross-sectional area at said inlet end to an enlarged cross-sectional area at said outlet end; for reducing, with respect to said longitudinal axis, the maximum angle of light passed through said outlet end relative to the maximum angle of light received through said inlet end; and (d) said light distribution harness comprises a plano-convex lens having a convex surface through which light is received from said coupling member, and a mirrored, planar surface confronting said coupling member and being for reflecting light at an angle that causes said light to substantially miss said coupler.

2. The coupling member of claim 1, wherein said polygonal shape of said elongated body increases from said inlet end to said outlet end in a substantially uniform manner.

3. The coupling member of claim 1, wherein:

(a) said elongated light transmissive body is hollow; and (b) a length of said elongated body along said longitudinal axis is no more than about the mathematical product of six times the ratio of the sine of said maximum angle of light passed through said outlet end to the sine of said maximum angle of light received through said inlet end.

4. The coupling member of claim 1, wherein:

(a) said elongated light transmissive body is solid; and (b) a length of said elongated body along said longitudinal axis is no more than about the mathematical product of nine times the ratio of the sine of said maximum angle of light passed through said outlet end to the sine of said maximum angle of light received through said inlet end.

5. The coupling member of claim 1, in combination with the light source.

* * * * *